(12) United States Patent
Sakata

(10) Patent No.: US 7,271,831 B2
(45) Date of Patent: Sep. 18, 2007

(54) IMAGE INPUT APPARATUS AND METHOD

(75) Inventor: Tsuguhide Sakata, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 10/413,304

(22) Filed: Apr. 15, 2003

(65) Prior Publication Data

US 2003/0197794 A1    Oct. 23, 2003

Related U.S. Application Data

(63) Continuation of application No. 08/786,112, filed on Jan. 17, 1997, now abandoned.

(30) Foreign Application Priority Data

Jan. 22, 1996 (JP) .................................. 8-026229

(51) Int. Cl.
*H04N 5/225* (2006.01)

(52) U.S. Cl. ................. 348/220.1; 348/222.1

(58) Field of Classification Search ................. 348/64, 348/220.1, 333.05, 222.1, 384.1, 739, 207.1; 375/240, 240.1

See application file for complete search history.

(56) References Cited

U.S. PATENT DOCUMENTS

| 4,546,390 | A | * | 10/1985 | Konishi et al. ............. 386/119 |
| 4,554,960 | A | * | 11/1985 | Pompier ...................... 152/450 |
| 4,779,135 | A | * | 10/1988 | Judd ........................... 348/565 |
| 4,899,212 | A | * | 2/1990 | Kaneko et al. ........... 348/220.1 |
| 5,218,432 | A | * | 6/1993 | Wakeland .................... 348/590 |
| 5,231,500 | A | * | 7/1993 | Miyaji et al. ............. 348/220.1 |
| 5,387,928 | A | * | 2/1995 | Nishimura .................... 348/70 |
| 5,404,883 | A | * | 4/1995 | Freedman et al. ........... 600/443 |
| 5,434,593 | A | * | 7/1995 | Lecklider et al. ............ 345/634 |
| 5,444,482 | A | * | 8/1995 | Misawa et al. ........... 348/220.1 |
| 5,497,193 | A | * | 3/1996 | Mitsuhashi et al. ..... 348/231.99 |
| 5,519,826 | A | * | 5/1996 | Harper et al. ................ 345/473 |
| 5,587,928 | A | * | 12/1996 | Jones et al. .................. 709/204 |
| 5,621,429 | A | * | 4/1997 | Yamaashi et al. ........... 715/803 |
| 5,689,641 | A | * | 11/1997 | Ludwig et al. .............. 709/241 |
| 5,751,348 | A | * | 5/1998 | Inuiya et al. ............. 348/220.1 |
| 5,903,315 | A | * | 5/1999 | Itoh et al. .................... 348/564 |
| 5,953,046 | A | * | 9/1999 | Pocock ........................ 725/134 |

* cited by examiner

*Primary Examiner*—David Ometz
*Assistant Examiner*—Pritham D. Prabhakher
(74) *Attorney, Agent, or Firm*—Morgan & Finnegan, LLP

(57) ABSTRACT

An image input apparatus is provided which is capable of taking a still image with high quality and with easy operations. The image input apparatus disclosed herein has a video camera and an expansion board mounted on a personal computer. The video camera has a lens, a shutter release switch, an image pickup device, a VIDS circuit, and the like. The expansion board connected via a camera cable to the video camera has a VIDS circuit, an A/D converter, a synchronous signal generator, and the like. As the shutter release switch of the video camera is depressed, the expansion board is controlled to read still image data and compress it. As the shutter release switch is released, it is controlled to resume the initial operations of reading moving image data and compressing it.

7 Claims, 9 Drawing Sheets

FIG. 4
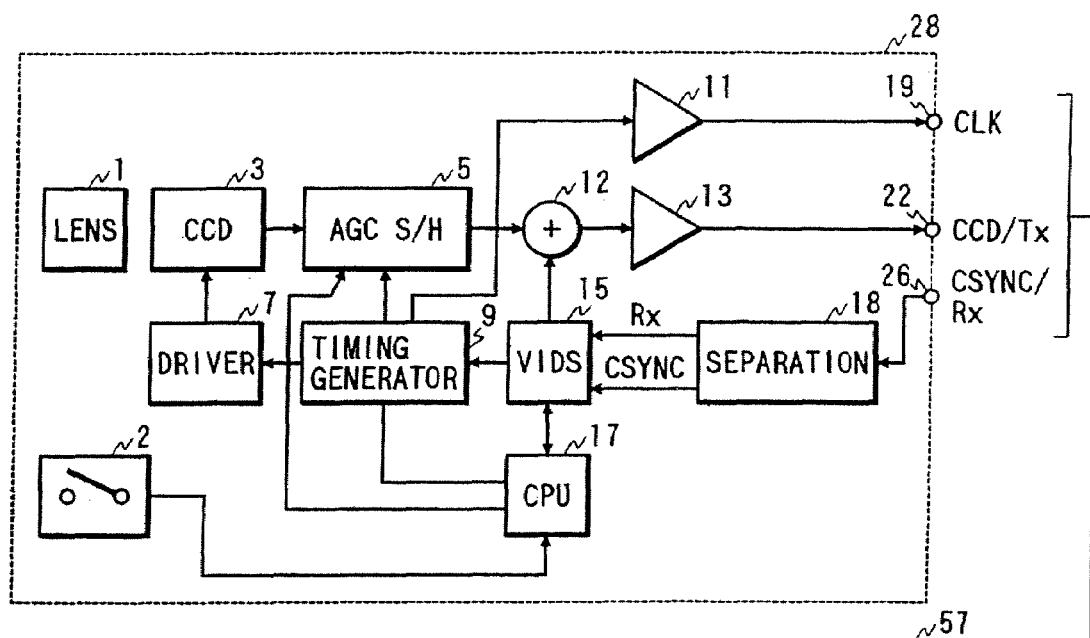
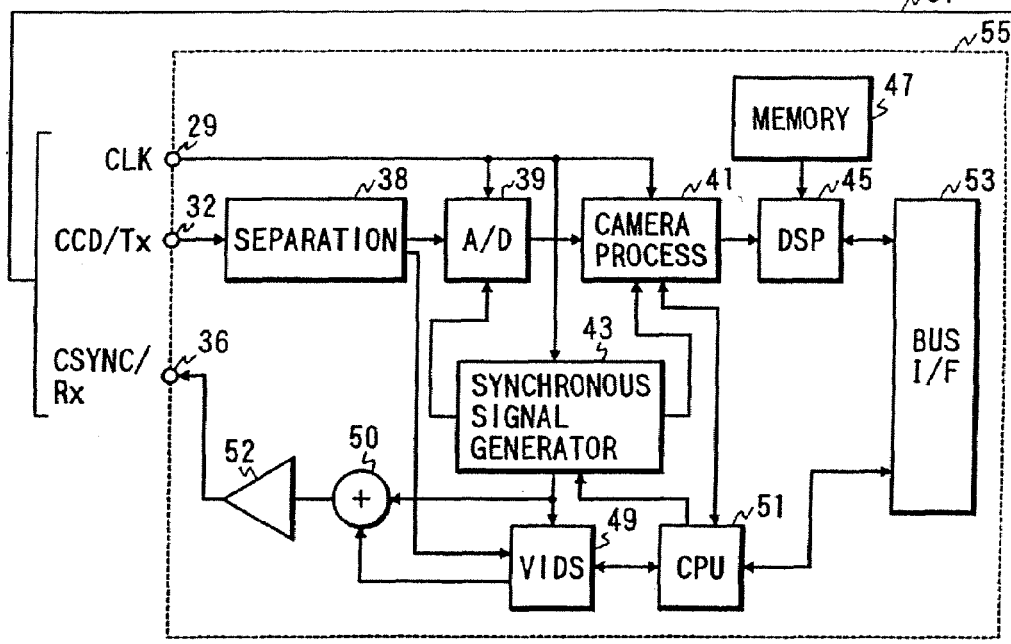

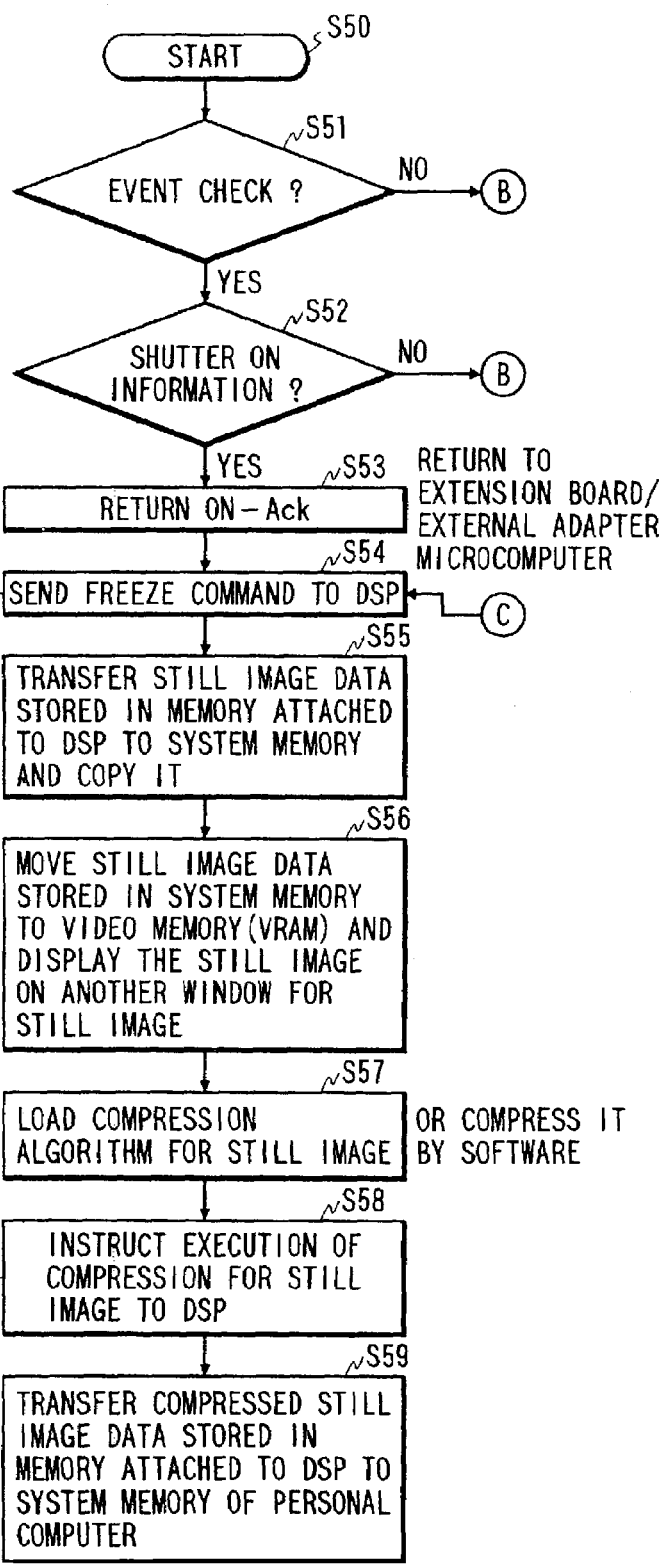

IMAGE INPUT APPARATUS AND METHOD

This is a continuation of prior application Ser. No. 08/786,112, filed Jan. 17, 1997 now abandoned, to which priority under 35 U.S.C. § 120 is claimed.

BACKGROUND OF THE INVENTION

1. Field of the Invention

The present invention relates to an image input apparatus of a video conferencing system.

2. Related Background Art

Video conferencing systems using personal computers are known, such as PCS100 and PCS50 from Picture Tel Corporation and Proshare from Intel Corporation. Such personal computer based video conferencing systems are also called a Desk Top Video Conferencing System (DTVC).

DTVC is now highlighted as a downsized version of a conventional video conferencing system which is configured basing based upon a video monitor and designed for use in a conferencing room. FIG. 5 is a block diagram of DTVC designed by present inventors. In FIG. 5, reference numeral 101 represents a video camera, reference numeral 102 represents a video board having an image pickup function and a data compression function, reference numeral 103 represents a communication board interfacing with, for example, an ISDN line, and reference numeral 104 represents a floppy disk for storing video conferencing software.

The video board 102 and the communication board 103 are expansion boards for personal computers and are inserted into expansion slots of the personal computers. FIG. 6 is a perspective view of a personal computer with the video board 102 and the communication board 103 being inserted into expansion slots and with the video camera 101 being mounted on a monitor 108 of the personal computer. Reference numeral 105 represents the main body of the personal computer, reference numeral 106 represents a mouse, and reference numeral 107 represents a keyboard.

The floppy disk 104 with video conferencing software is inserted into a disk drive of the personal computer 105 and an operator enters necessary commands to load the video conferencing software into a hard disk (not shown) of the personal computer.

After the video conferencing software is loaded, it is activated by entering necessary commands. Then, an image (LOCAL) of an operator is picked up with the video camera 101 and displayed on the screen of the monitor 108. FIG. 7 illustrates an image of the operator displayed on the monitor 108.

A remote side is called, for example, via an ISDN line by entering necessary commands. After preset connection operations, an image (REMOTE) of the partner is displayed on the monitor 108. FIG. 8 illustrates the images of the operator (LOCAL) and the partner (REMOTE) displayed on the monitor 108. In the above manner, video conferencing is made between the two participants.

How voices at video conferencing are processed is not relevant to this invention, and so the description thereof is omitted.

With the above video conferencing system, however, the video camera is used on the assumption that it always picks up moving images. There are the following problems of picking up still images.

Two methods have been used in taking a still image. Each method is associated with a problem specific to it. With a first method, a still image is taken in a moving image mode. The video camera 101 shown in FIG. 6 is dismounted from the monitor 108 and mounted on a document pickup stand to take an image of a document. In the moving image mode, an image is transmitted in accordance with the ITU-T International Standards, for example, a protocol stipulated by H320. A moving image containing video and audio signals is transmitted at a transmission rate of 64 Kbps (56 Kbps in USA) of a general ISDN line. A moving image is compressed greatly at about $1/100$ to $1/200$ by using interframe correlation for moving image compensation stipulated by H261. A still image picked up by this compression scheme gradually increases its resolution in several seconds to ten and several seconds.

Therefore, after transmission of a document during a video conference, it takes about 10 seconds to clearly recognize characters. This is inconvenient to use. Furthermore, the image quality after 10 seconds is inferior to that of JPEG compression dedicated to still images. The quality of a still image has been desired to be improved.

With a second method, a still image is picked up in a still image mode. The video camera 101 shown in FIG. 6 is dismounted from the monitor 108 and mounted, for example, on a document pickup stand. A still image pickup mode of software is selected, for example, by clicking a mouse to freeze a still image.

Since data compression dedicated to still images can be used, there is no problem of image quality. However, mouse clicking or the like is required in addition to framing of the video camera. This poses a problem of difficult operations by a user. This problem becomes conspicuous, especially when the video camera is not mounted on the stand but is held with a hand. It is very difficult to operate a mouse with a right hand while the video camera is held with the left hand.

SUMMARY OF THE INVENTION

It is an object of the present invention to solve the above problems and provide an image input apparatus and method capable of making a user easy to use.

It is another object of the present invention to provide an image input apparatus and method capable of easily instructing a compression operation.

It is a further object of the present invention to provide an image input apparatus suitable for use in combination with a host computer.

According to a preferred embodiment achieving the above objects, an image input apparatus is disclosed, which comprises image pickup means and processing means for compressing a video signal transmitted from the image pickup means, the image pickup means including switching means for switching an image pickup between a moving image and a still image and notification means for notifying the processing means of an on/off state of the switching means, and the processing means including first compression means for executing compression suitable for the moving image, second compression means for executing compression suitable for the still image, and selection means for selecting the first or second compression means in accordance with the notified on/off state.

It is another object of the present invention to provide software and its medium for use with a host computer running in combination with an image input apparatus.

The above and other objects and features of the present invention will become apparent from the following embodiments and drawings.

BRIEF DESCRIPTION OF THE DRAWINGS

FIG. 4 is a block diagram showing the structure of an image input apparatus according to a second embodiment.

DETAILED DESCRIPTION OF THE PREFERRED EMBODIMENTS

Embodiments of an image input apparatus of the invention will be described. The image input apparatus of each embodiment is applied to video conferencing systems.

Figure 1:
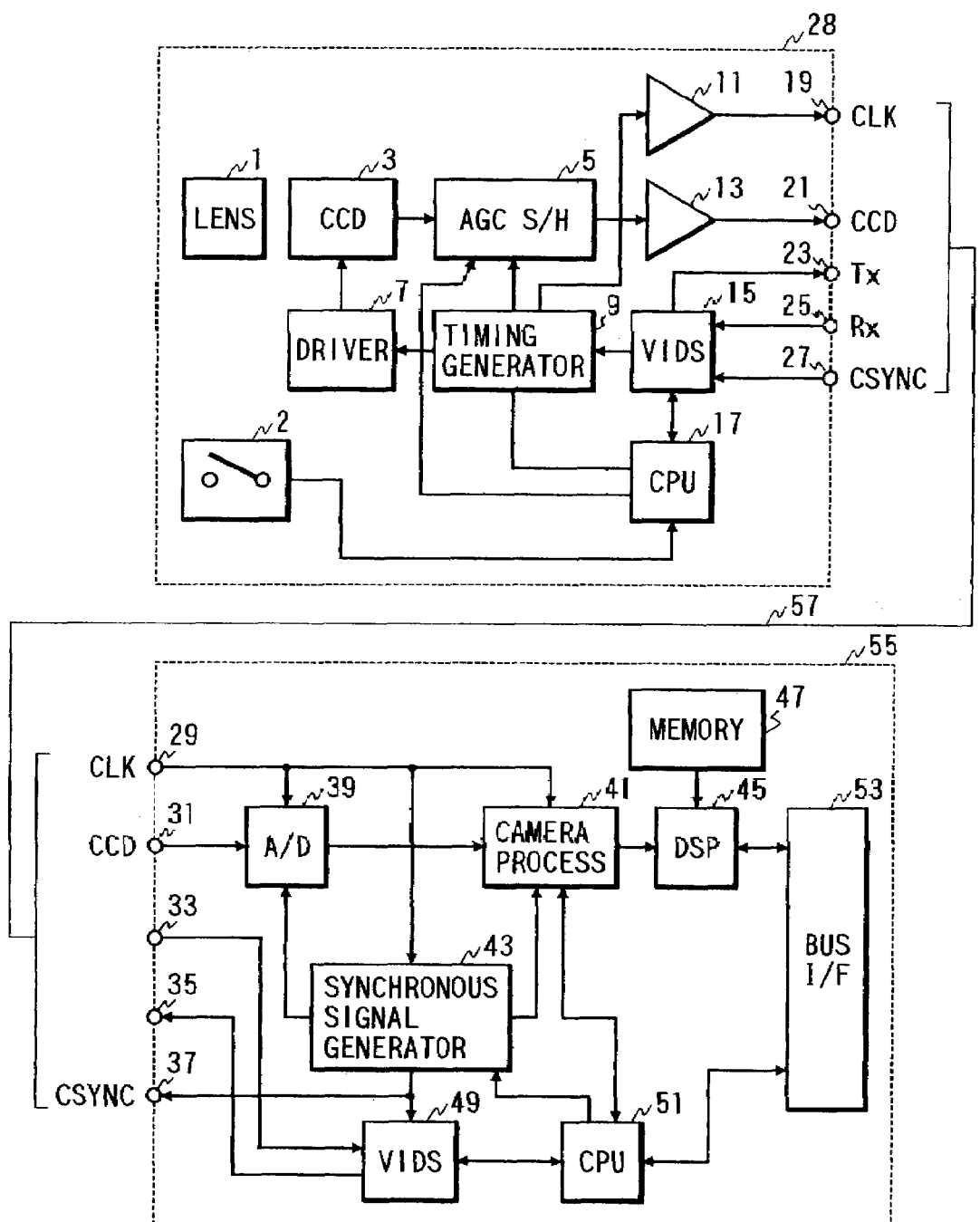
FIG. 1 is a block diagram showing the structure of an image input apparatus according to a first embodiment.

FIG. 1 is a block diagram showing the image input apparatus according to the first embodiment of the invention. The image input apparatus has a video camera 28 and an expansion board 55 mounted on a personal computer (not shown).

In the video camera 28, reference numeral 1 represents a lens, reference numeral 2 represents a shutter release switch, and reference numeral 3 represents an image pickup element (CCD). Reference numeral 5 represents an automatic gain controller (AGC) circuit and a sample/hold circuit which are generally formed on a single IC. Reference numeral 7 represents a CCD driver, reference numeral 9 represents a timing generator for supplying timing signals to AGC 5, CCD 3, 75 Ω driver 11 to be described later, and the like, reference numeral 11 represents the 75 Ω driver for a sampling clock, and reference numeral 13 represents a 75 Ω drive for a sampled/held CCD output.

Reference numeral 15 represents a Vertical Interval Data Signal (VIDS) circuit for embedding data during a vertical blanking period, reference numeral 17 represents a microcomputer (CPU), reference numeral 19 represents a sampling clock output terminal, reference numeral 21 represents a CCD output terminal for a sampled/held CCD output, and reference numeral 23 represents an output terminal for a VIDS signal from the video camera.

Reference numeral 25 represents a VIDS signal input terminal for the video camera 28, and reference numeral 27 represents a composite synchronous signal input terminal.

Reference numeral 29 represents a sampling clock input terminal mounted on the expansion board 55 of the personal computer. Reference numeral 31 represents an input terminal for the CCD signal, reference numeral 33 represents an input terminal for the VIDS signal from the video camera 28, reference numeral 35 represents an output terminal for the VIDS signal to be supplied to the video camera 28, reference numeral 37 represents a composite synchronous signal output terminal, reference numeral 39 represents an A/D converter, reference numeral 41 represents a digital camera process circuit, reference numeral 43 represents a synchronous signal generator (SSG), and reference numeral 45 represents a digital signal processor (DSP) for data compression.

Reference numeral 47 represents a memory for DSP 45 which is constituted of a ROM part for storing DSP programs and a RAM part for processing data of DSP 45. Reference numeral 49 represents a VIDS circuit for inserting data during the vertical blanking period of a video signal, reference numeral 51 represents a microcomputer (CPU), and reference numeral 53 represents a bus I/F circuit for transfer data to and from the personal computer. These constituent elements 29 to 53 are fabricated on the expansion board. Reference numeral 57 represents a camera cable interconnecting the video camera 28 and the expansion board 55.

The operation of the image input apparatus constructed as above will be described. After power is supplied to the personal computer, video conferencing software is activated by entering necessary commands to set up the expansion board 55 and the video camera 28.

Upon activation, CPU of the personal computer initializes DSP 45 via the bus I/F circuit 53 and thereafter sets DSP 45 to a moving image compression H261 mode which is a first compression mode. This setting may be performed by loading a moving image compression program stored in the memory 47 into DSP 45 or by transmitting the moving image compression program from the personal computer via the bus I/F 53.

CPU of the personal computer initializes CPU 51 of the expansion board 55 via the bus I/F circuit 53. Upon this initialization, CPU 51 establishes a bi-directional communication channel to CPU 17 of the video camera 28 via the VIDS circuits 15 and 49.

It is necessary to initialize CPU 17 of the video camera before the communication channel is established. This initialization is executed by CPU 51 of the expansion board 55 controlling the power to the video camera 28 via the cable 57.

After the communication channel is established, in accordance with data set by CPU of the personal computer, CPU 51 sets the contents of the digital camera process circuit 41 and the synchronous signal generator (SSG) 43. The contents of this setting include setting NTSC or PAL, setting 270 thousands pixels or 410 thousands pixels of CCD pixels, and other settings. Similar setting data is transferred from CPU 51 of the expansion board 55 to CPU 17 of the video camera via the communication channel. CPU 17 of the video camera 28 therefore sets the contents of the timing generator 9 and the AGC sample/hold circuit 5.

After setting the contents, the CCD driver 7 converts a predetermined timing pulse supplied from the timing generator 9 into a CCD drive waveform and supplies it to CCD 3. An image focussed on CCD 3 via the lens 1 is therefore input to the AGC sample/hold circuit 5.

In setting the gain of AGC, a shutter speed of the timing generator 9, and the like, the digital camera process circuit 41 of the expansion board 55 forms a control loop with these circuit elements to realize AE (automatic exposure or automatic iris). This is not relevant to this invention, and so the detailed description thereof is omitted.

An output signal from the AGC sample/hold circuit 5 is supplied to the 75 Ω driver 13 and sent via the output terminal 21 and cable 57 to the input terminal 31 of the expansion board 55.

A CCD sampling clock generated by the timing generator 9 is supplied to the 75 Ω driver 11 and sent via the output terminal 19 and cable 57 to the input terminal 29 of the expansion board 55.

The sampling clock is supplied to the A/D converter 39 which converts the CCD signal into a digital signal. The sampling clock is also supplied as a master clock signal to the synchronous signal generator (SSG) 43 and digital camera process circuit 41. SSG 43 generates a predetermined composite synchronous signal and supplies it to the VIDS circuit 49 of the expansion board 55 and to the VIDS circuit 15 of the video camera 28 via the output terminal 37, cable 57, and input terminal 27, to thereby synchronize both the VIDS circuits 15 and 49.

Figure 7:
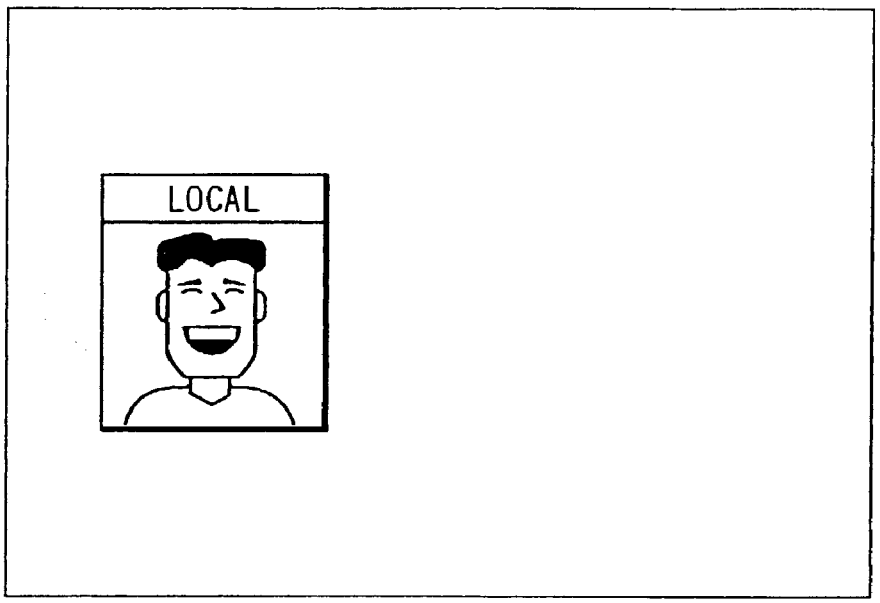
FIG. 7 is a diagram illustrating the image of an operator displayed on the monitor.
Figure 8:
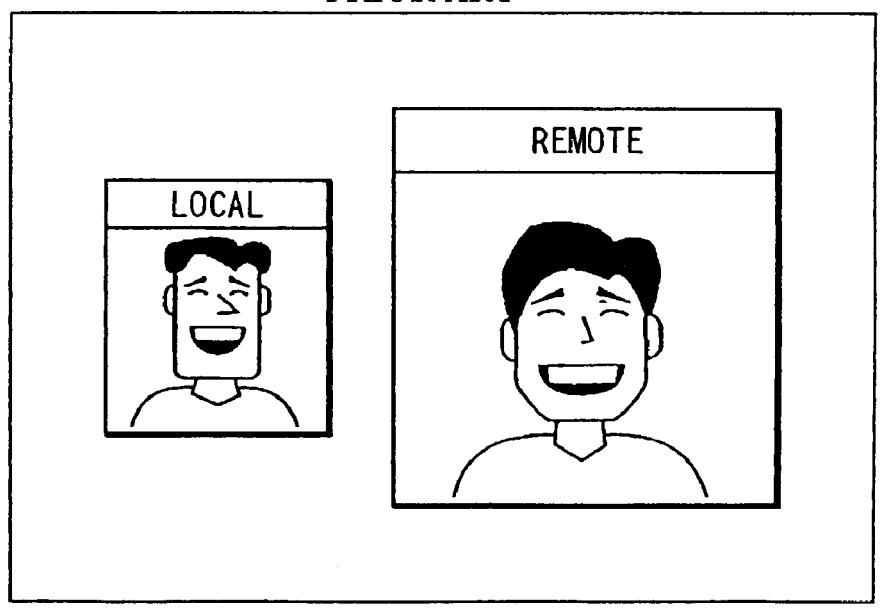
FIG. 8 is a diagram illustrating the images of the operator and a partner at a remote site displayed on the monitor.

An output signal from the A/D converter 39 is sent to the video camera process circuit 41 which performs various color processing and eventually outputs digital Y and U/V signals to DSP 45. DSP 45 already set to the moving image compression mode compresses the moving image data of Y and U/V signals by using the memory 47 for calculation. The compressed results are transferred via the bus I/F circuit 53 to the personal computer to display the local image on the monitor in the manner illustrated in FIG. 7.

A method of transferring the image to the remote side and a method of receiving and displaying the image at the remote side are not relevant to this invention, and so the description thereof is omitted.

Next, taking a still image of a document, picture, name card, or the like by dismounting the video camera 28 from the monitor of the personal computer, will be described. In this case, the user holds the video camera with a single or both hands to perform framing while viewing the image displayed on the monitor of the personal computer.

After the framing, the user depresses the shutter release switch 2. This depression is detected by CPU 17 of the video camera 28 and is notified to CPU 51 of the expansion board 55, via the VIDS circuit 15 of the video camera 28 and the VIDS circuit 49 of the expansion board 55.

This notification information is supplied via the bus I/F circuit 53 to the video conferencing software running on the personal computer. Upon reception of this information, the video conferencing software changes at a predetermined timing via the bus I/F circuit 53 the setting of DSP 45 to the still image compression mode which is a second compression mode.

The Y and U/V signals input to DSP 45 are processed as a still image of one frame at a predetermined timing or as a still image of one field through software setting, to execute still image data compression.

Figure 2:
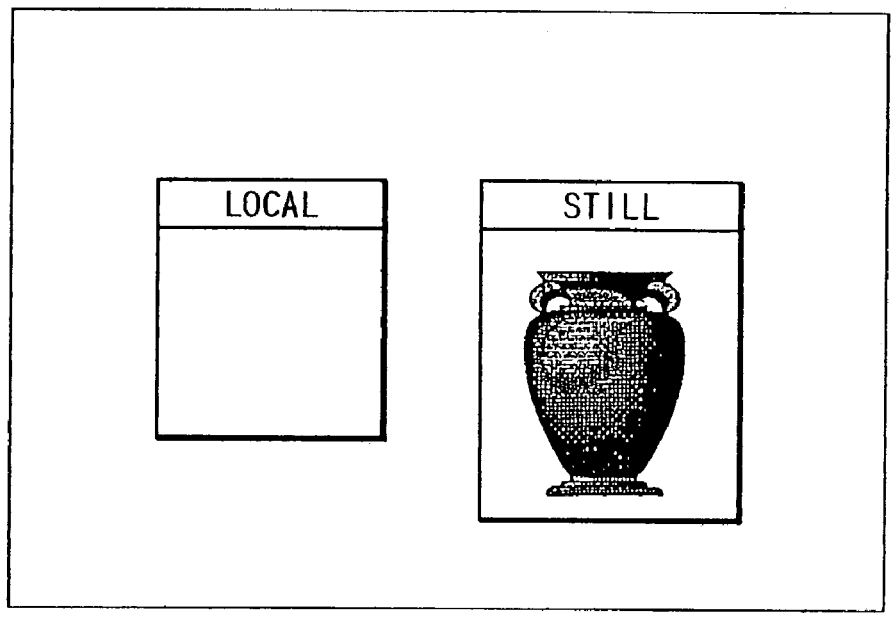
FIG. 2 is a diagram illustrating a window for a still image displayed on a monitor.

The execution results are supplied via the bus I/F circuit 53 to the video conferencing software running on the personal computer to display a still image in a window of the monitor. FIG. 2 illustrates a still image in a window displayed on the monitor.

Immediately after a still image of one frame is compressed, DSP 45 resumes the moving image compression mode to update the local moving image window.

Figure 3:
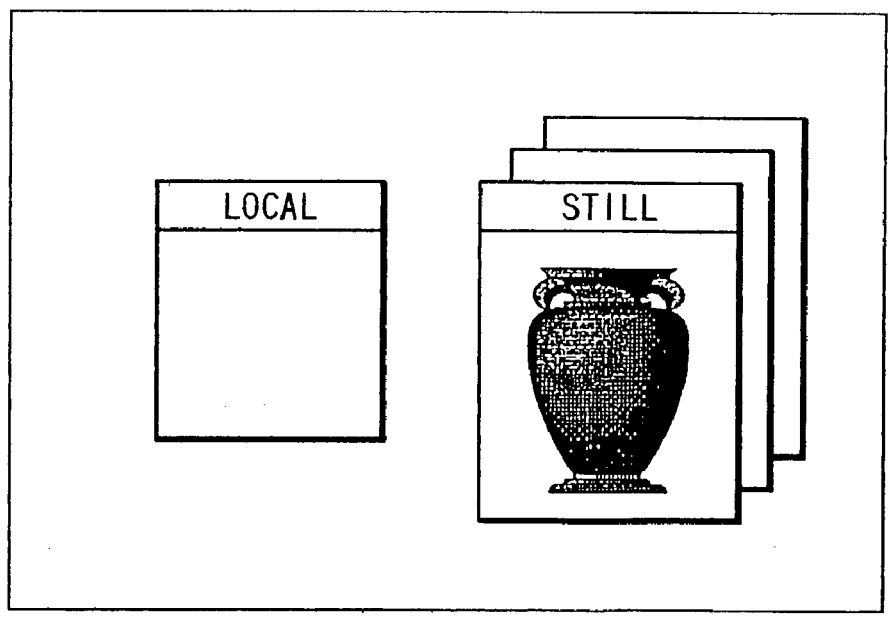
FIG. 3 is a diagram illustrating windows for still images sequentially picked up.
Figure 5:
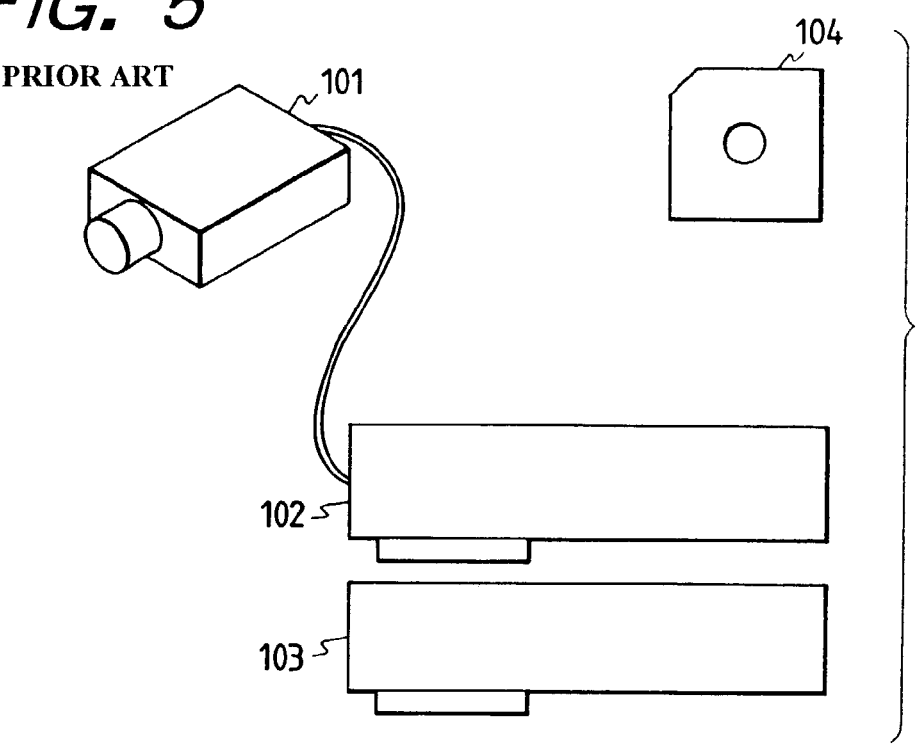
FIG. 5 is a block diagram showing the structure of a conventional DTVC.
Figure 6:
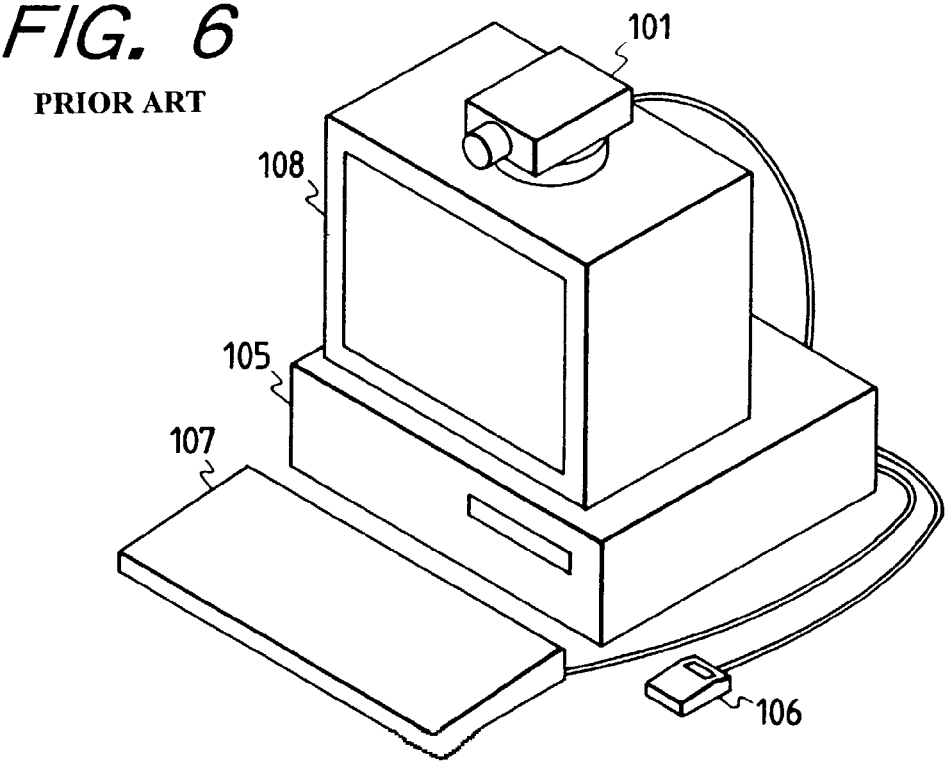
FIG. 6 is a perspective view of a personal computer with a video board and a communication board being inserted and a video camera being mounted on a monitor of the personal computer.

If the user maintains depressing the shutter release switch 2 to sequentially take still images, DSP 45 is controlled to maintain the still image mode while the shutter release switch 2 is depressed, to thereby generate a plurality of still image windows in the order of pickup. FIG. 3 illustrates a plurality of windows with still images being displayed therein in the order of pickup.

Immediately after sequential pickup, DSP 45 is controlled to resume the moving image compression mode to update the local moving image window.

As described above, execution of input and compression of the still image is controlled by depressing the shutter release switch 2. When the shutter release switch 2 is opened, the moving image input and compression mode is reactivated.

During picking up a still image or a moving image, the set value of white balance of the video camera 28 may be changed by the user. A still image is generally an image of a document, drawing, name card, or the like. In this case, it is preferable that blue is somewhat emphasized to make a paper sheet whitish. On the other hand, a moving image is generally an image of a person. In this case, it is preferable that red is somewhat emphasized to make the color of a face look better. In order to satisfy this contradictory condition, the set value of white balance may be shifted by a predetermined amount to the blue color while the shutter release switch 2 is depressed, and while the shutter release switch 2 is detached, the original set value for a person (toward red) may be resumed.

Alternatively, as a still image is picked up, i.e., when the shutter release switch 2 is depressed, optical character recognition (OCR) software may be activated. The reason for this is that a still image is often an image of a document such as name cards, and after a still image is picked up, OCR software is usually activated to convert character images into character codes.

The operation of changing the set value of white balance can be performed, for example, by controlling the digital camera process circuit 41 when CPU 51 of the expansion board 55 shown in FIG. 1 detects a depression of the shutter release switch 2.

FIG. 4 is a block diagram showing the structure of the image input apparatus of the second embodiment. In FIG. 4, reference numeral 12 represents an adder, reference numeral 18 represents a separation circuit, reference numeral 22 represents an output terminal for an addition signal of a CCD signal and a VIDS signal, and reference numeral 26 represents an input terminal for an addition signal of a composite synchronous signal and a VIDS signal.

Reference numeral 32 represents an input terminal on the expansion board 55 for an addition signal of the CCD signal and the VIDS signal, reference numeral 36 represents an output terminal on the expansion board 55 for an addition signal of the composite synchronous signal and the VIDS signal, reference numeral 38 represents a separation circuit, reference numeral 50 represents an adder, and reference numeral 52 represents a 75 Ω driver.

In the image input apparatus of this embodiment, a pair of the CCD signal and VIDS signal and a pair of the composite synchronous signal and VIDS signal are each multiplexed to reduce the number of wires of the connection cable 57. The other structures are the same as the first embodiment.

Instead of multiplexing the CCD signal and VIDS signal, and the composite synchronous signal and VIDS signal, it is obvious that the CCD signal and VIDS signal may be multiplexed, and the composite synchronous signal and VIDS signal may be separated similar to the first embodiment, or conversely the CCD signal and VIDS signal may be separated similar to the first embodiment, and the composite synchronous signal and VIDS signal may be multiplexed.

In the first and second embodiments respectively shown in FIGS. 1 and 4, if the block for interface with the personal computer, i.e., the bus I/F 53 block is replaced by an adapter I/F, the expansion board 55 for processing video signals mounted in the personal computer in the first and second embodiments can be replaced by an external adapter mounted externally of the personal computer. This external adapter I/F may be high speed serial I/F (IEEE 1394), low speed serial I/F such as USB, RS232C, or parallel I/F such as SCSI and bi-directional Centronics.

In both the first and second embodiments, CCD signals pass through the connection cable 57. Instead, NTSC signals may be passed through the connection cable 57 with the same advantageous effects of this invention, by mounting an A/D converter, a digital camera process circuit, an NTSC encoder, and the like on the video camera 28 and by mounting an NTSC decoder on the expansion board 55.

Next, the operations of processes to be executed by software of the microcomputer 17 of the video camera 28, by software of the microcomputer 51 of the expansion board (external adapter) 55, and by software on the personal computer side, respectively of the embodiments of the invention will be described.

FIGS. 9, 10, 11A and 11B are flow charts illustrating the operations of processes to be executed by software of the video camera microcomputer 17, by software of the expansion board (external adapter) microcomputer, and by software on the personal computer side.

Figure 9:
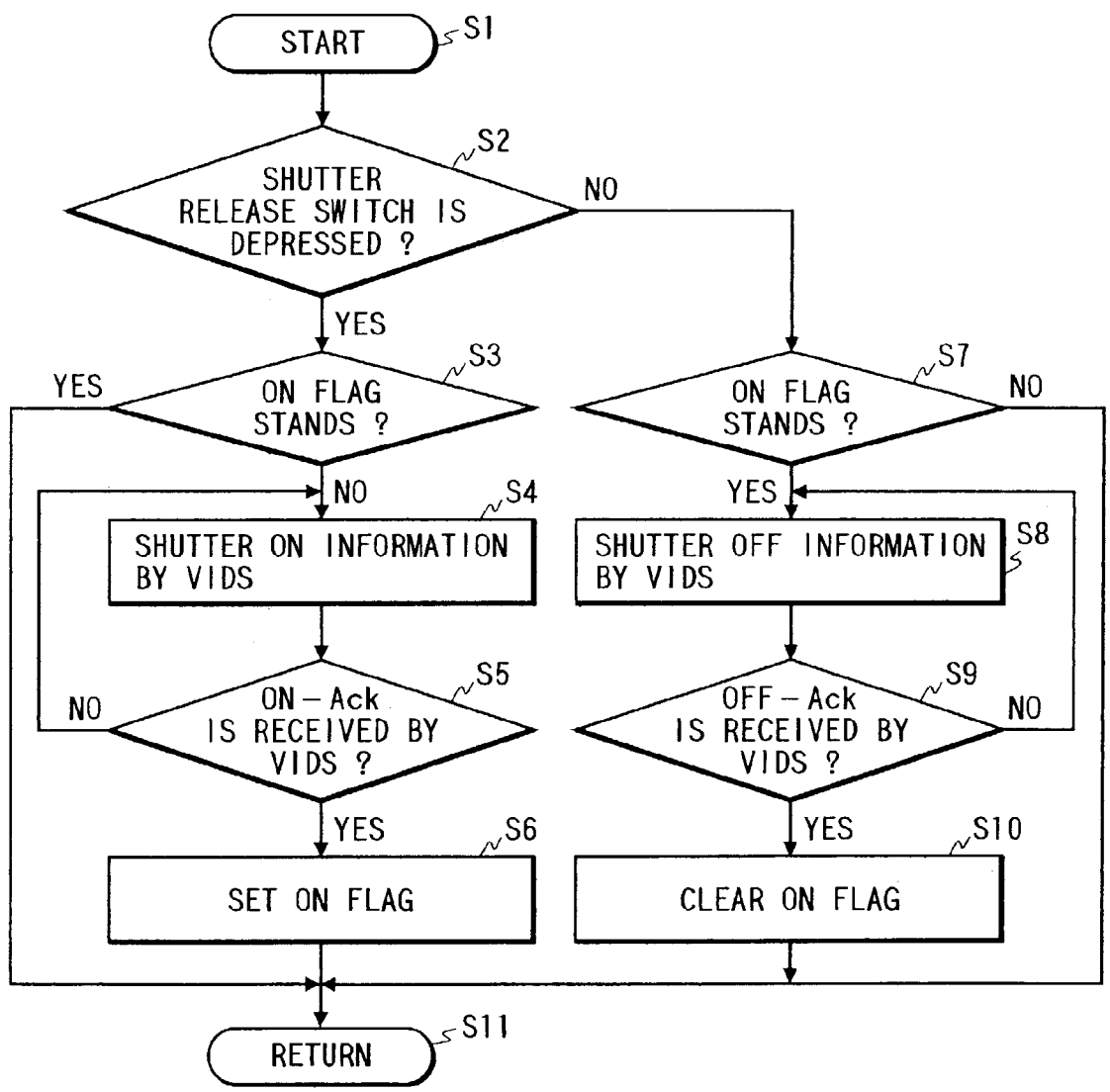
FIG. 9 is a flow chart illustrating the operation of a shutter interrupt process routine by a video camera microcomputer.

FIG. 9 is a flow chart illustrating the operation of processes to be executed by the microcomputer 17 of the video camera shown in FIGS. 1 and 4, particularly an interrupt process routine activated by the shutter release switch 2 shown in FIGS. 1 and 4. After the power is turned on and a predetermined initializing process is completed, the video camera microcomputer as predetermined operations. Thereafter, the operation periodically jumps to an interrupt process routine, for example, at an interrupt timing of a period of a V synchronous signal supplied from the timing generator 9 in FIGS. 1 and 4.

In this routine, the microcomputer 17 checks at Step S2 in FIG. 9 whether the shutter release switch has been depressed. If not, the routine advances to Step S7 to check a shutter ON flag. Since this flag is not set at the initial stage, this routine is terminated to return to the main routine.

If the shutter release switch has been depressed at Step S2, the routine advances to Step S3 to check the shutter ON flag. Since this flag is not set at the initial stage, the routine advances to Step S4 whereat shutter ON information is transmitted to the expansion board (or external adapter) 55 by using the VIDS signal. After transmission, an acknowledge (Ack) signal from the expansion board is awaited at Step S5. If the Ack signal is not received, the shutter ON information is again transmitted at Step S4. If the Ack signal is received, the shutter ON flag is set at Step S6. After the shutter ON flag is set, the interrupt process routine is terminated to return to the main routine.

In summary, in this routine, "when the shutter release switch is depressed first, the shutter ON information is transmitted to the expansion board (or external adapter)". Once the shutter is depressed, the following operations are performed. After the main routine jumps to the interrupt process routine at the next V period, it is checked at Step S2 whether the shutter release switch was depressed. If not, the routine advances to Step S7 to check the ON flag. Since the ON flag was set, the routine advances to Step S8 whereat shutter OFF information is transmitted to the expansion board (or external adapter) 55 by using the VIDS signal. After this transmission, an Ack signal from the expansion board is awaited at Step S9. If the Ack signal is not received, the shutter OFF information is again transmitted at Step S8. If the Ack signal is received, the shutter ON flag is cleared at Step S10. After the shutter ON flag is cleared, the interrupt process routine is terminated to return to the main routine. If it is judged at Step S2 that the shutter was depressed, it is judged at Step S3 that the ON flag was set so that the routine returns to the main routine. In summary, "when the shutter release switch is released, the shutter OFF information is transmitted to the expansion board (or external adapter)". With the above routine, the video camera microcomputer can transmit the shutter ON and OFF information.

Figure 10:
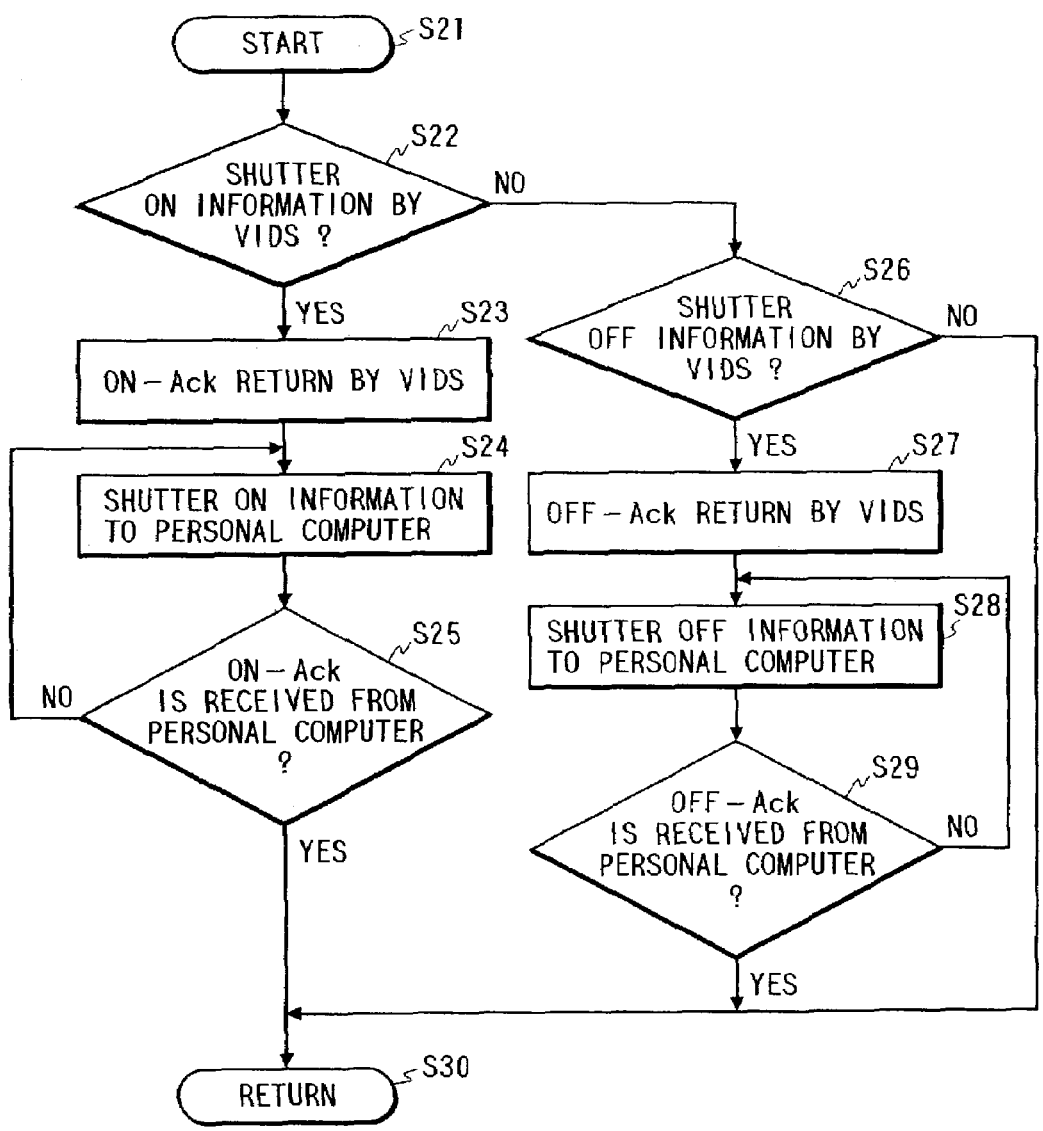
FIG. 10 is a flow chart illustrating the operation of a shutter interrupt process routine by an expansion board (external adapter) microcomputer.

FIG. 10 is a flow chart illustrating the operation of processes to be executed by the microcomputer 51 of the expansion board (or external adapter) shown in FIGS. 1 and 4, particularly an interrupt process routine to be activated by the shutter release switch 2 shown in FIGS. 1 and 4. After the power is turned on and a predetermined initializing process is completed, the microcomputer as a system controller for the expansion board (or external adapter) starts executing predetermined operations. Thereafter, the microcomputer periodically checks, for example, at an interrupt timing of a period of a V synchronous signal supplied from the synchronous signal generator 43 shown in FIGS. 1 and 4, whether the VIDS circuit 49 has received data. If it is judged that the VIDS circuit has received data transmitted from the video camera, the main routine jumps to Step S21 of a shutter interrupt process routine shown in FIG. 10.

In this routine, the microcomputer 51 checks at Step S22 whether the received data is the shutter ON information. If it is the shutter ON information, an Ack signal for the shutter ON information is sent back at Step S23 to the video camera by using the VIDS signal. After the shutter ON information is transmitted at Step S24 to the personal computer, it is checked at Step S25 whether an Ack signal is received from the personal computer. If not, the shutter ON information is again transmitted at Step S24, whereas if the Ack signal is received, this routine is terminated to return to the main routine.

If it is judged at Step S22 that the received data is not the shutter ON information, it is checked at Step S26 whether the received data is the shutter OFF information. If it is the shutter OFF information, an Ack signal for the shutter OFF information is sent back at Step S27 to the video camera by using the VIDS signal. Thereafter, the shutter OFF information is transmitted at Step S28 to the personal computer. It is checked at Step S29 whether an Ack signal is received from the personal computer. If not, the shutter OFF information is again transmitted at Step S28, whereas if the Ack signal is received, this routine is terminated to return to the main routine. If it is judged at Step S26 that the received data is not the shutter OFF information, this routine is terminated to return to the main routine.

With the above operations, the microcomputer of the expansion board (or external adapter) transmits the shutter ON and OFF information to the software on the personal computer side.

Figure 11B:
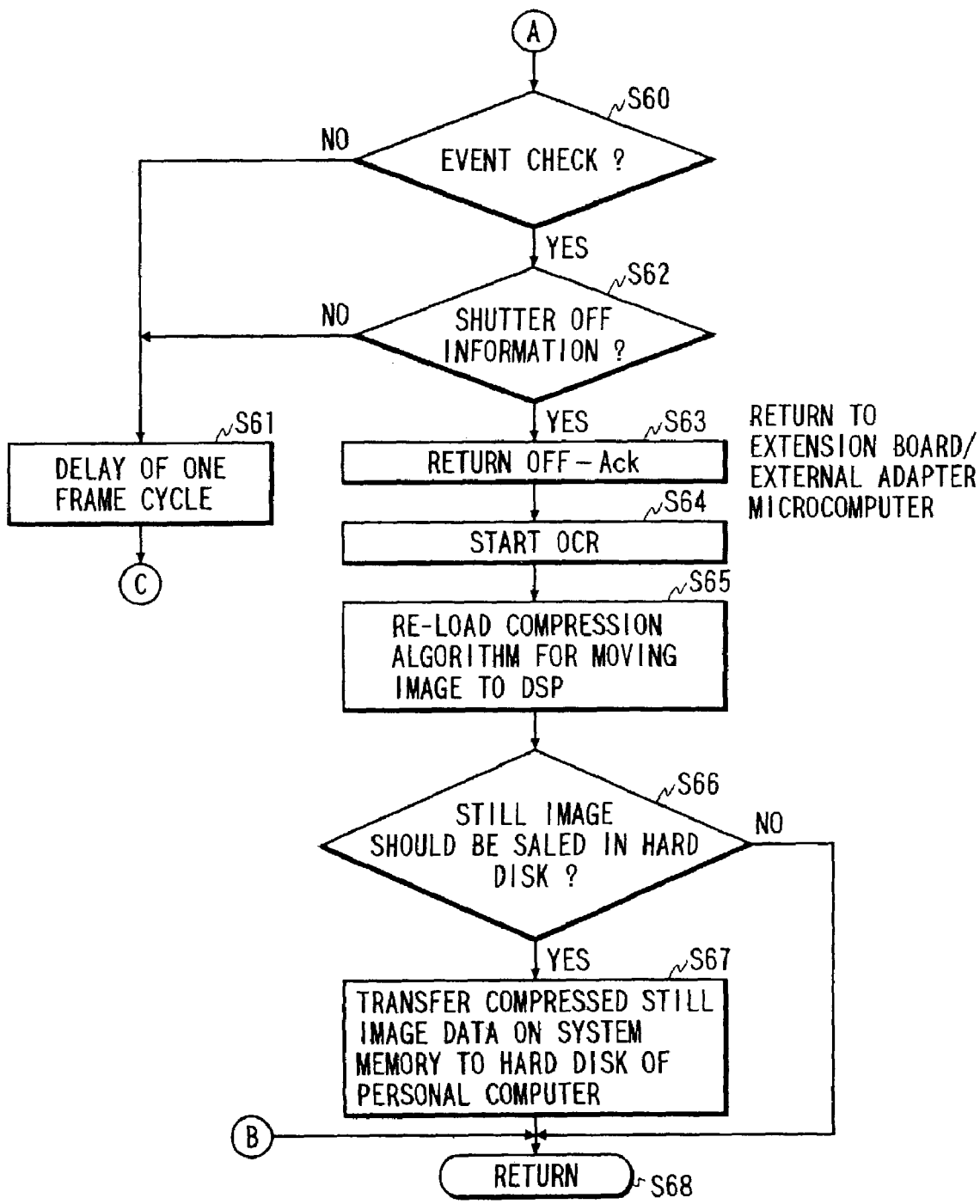
FIG. 11 is comprised of FIGS. 11A and 11B showing a flow chart illustrating the operation of a shutter interrupt process routine on a personal computer side.

FIGS. 11A and 11B are flow charts illustrating the operation of processes to be executed by the personal computer, particularly an interrupt process routine to be activated by the shutter release switch.

Application software running on the personal computer generally checks an event (external notification information) at a period of 1 millisecond or shorter.

Specifically, an event is checked at a period faster than the V period (in NTSC, 16.7 milliseconds). With the application software of this embodiment, it is assumed that after the start-up, DSP 45 shown in FIGS. 1 and 4 is loaded with a moving image compression algorithm, a moving window is displayed on the screen of the personal computer, and an image picked up with the video camera is displayed in this window. Techniques such as DMA (Direct Memory Access) are used for displaying a moving image. These techniques are not relevant to this invention, and so the description thereof is omitted.

As an event is checked at a period of 1 millisecond or shorter at Step S51 shown in FIG. 11A and if there is an event, the routine advances to Step S52 to check whether the event is the shutter ON information. If it is the shutter ON information, an Ack signal for the shutter ON information is sent back to the microcomputer of the expansion board (or external adapter). Since the shutter release switch was depressed, the following series of processes for a still image is performed.

First, a freeze command is sent at Step S54 to DSP 45 shown in FIGS. 1 and 4. Upon reception of the freeze command, DSP stores video signals of one frame in its memory, synchronously with the period of the V signal. Specifically, DSP stops the DMA transfer of moving images and stores image data of one frame in its memory 47 shown in FIGS. 1 and 4. Thereafter, at Step S55 the still image data of one frame in the memory is transferred to the system memory of the personal computer. In this case, the still image data of one frame in the memory is left undeleted in order to use it for a later compression process. Thereafter, at Step S56, the still image data of one frame in the system memory is transferred to a video memory (VRAM) and displayed on another still image window. Thereafter, at Step S57 the compression algorithm (e.g., JPEG) is downloaded in DSP which is instructed at Step S58 to execute compression. DSP compresses the still image data of one frame in the memory, and stores the compressed data in the memory. Although compression of the still image data can be executed by the software of the personal computer, it is assumed in this embodiment that DSP executes the compression. The compressed data stored in the memory of DSP is transferred at Step S59 to the system memory of the personal computer. It is checked at Step S60 whether there is another event. If not, it means continuous depression of the shutter. Therefore, at Step S61 one frame cycle is delayed and thereafter, the routine returns to Step S54 to process the next frame. In this case, the still image compression algorithm is not necessary to be downloaded at Step S57. Step S57 may be placed before Step S54. In this case, a time (several seconds) for downloading the algorithm is required before the freeze operation at DSP after the shutter release switch is depressed. This time becomes a time lag.

If there is another event at Step S60, the routine advances to Step S62 to check whether the event is the shutter OFF information. If not, it means continuous depression of the shutter. Therefore, at Step S61 one frame cycle is delayed and the routine returns to Step S54 to process the next frame.

If it is judged at Step S62 that the event is the shutter OFF information, it means that the shutter was released. In this case, an Ack signal for the shutter OFF information is sent back at Step S63 to the microcomputer of the expansion board (or external adapter). Thereafter, at Step S64, OCR (optical character recognition) software, for example, is activated. The reason for this is that a still image is often an image of a printed document such as name cards, and after a still image is picked up, OCR software is usually activated to automatically convert character images into character codes. If the OCR software is automatically activated after the release of the shutter, i.e., after the operation of picking up a still image is terminated, the user can easily use the image input apparatus.

Thereafter, at Step S65 the moving image compression algorithm is again downloaded in DSP. Similar to the operation before depressing the shutter, a moving image is displayed in the moving image window. At Step S66 a dialog box is displayed to ask the user whether the still image displayed in the still image window is to be saved in a hard disk as a still image file. If the still image is to be saved, the compressed still image data in the system memory of the personal computer is saved at Step S67 in the hard disk of the personal computer. If not at Step S66, Step S67 is skipped.

With the above operations, a series of interrupt routines before a release of the shutter release switch and after the depression thereof is completed.

According to the embodiments of the image input apparatus, before processing means compresses an image signal transmitted from image pickup means, switching means provided in the image pickup means switches an image pickup from a moving image to a still image, notification means notifies the processing means of an on-off state of the switching means, and selection means provided in the processing means selects first compression means suitable for compression of the moving image or second compression means suitable for compression of the still image, in accordance with the notified on-off state. Accordingly, when a still image such as a document, a drawing, and a name card becomes necessary to be transmitted to the partner during video conferencing, the still image can be picked up easily by merely operating upon the switching means provided in the image pickup means, and the second compression means can compress the picked-up still image with high quality. It is therefore possible to provide an image input apparatus used with video conferencing systems capable of improving image resolution and making easy to use.

According to the image input apparatus of the embodiments, if the switching means is not depressed and in an off-state, the selection means selects said first compression means, and if the switching means is depressed and in an on-state, the selection means changes a selection of the first compression means to a selection of the second compression means and resumes a selection of the first compression means after a lapse of a predetermined time. Accordingly, a still image can be taken only by depressing the switching means and the second compression means can compressed the still image with high quality. It is therefore possible to make the image input apparatus easy to use.

According to the image input apparatus of the embodiments, the predetermined time is a time required for the second compression means at least to compress image signals in unit of frame or field. Accordingly, it is possible to automatically change to the compression suitable for the moving image after the compression of the still image is completed. It is therefor possible to make the image input apparatus easy to use. In addition, the second compression means certainly can perform compression of the video signal on the unit basis of frame or field.

According to the image input apparatus of the embodiments, if the switching means continues to be depressed, the second compression means continues to compress image signals in unit of frame or field, and after the lapse of the predetermined time after the switching means is not depressed, an operation by the first compression means resumes. It is therefore possible to sequentially take still images.

According to the image input apparatus of the embodiments, the apparatus further includes display means for displaying the compressed image signals, wherein the display means displays image signals compressed by the first and second compression means in different windows, and the window displaying the image signals compressed by the second compression means is formed separately for each frame or field. Accordingly, a moving image and a still image can be displayed easy to be discriminated. Particularly, still images can be displayed separately for each frame or field.

According to the image input apparatus of the embodiments, the notification means notifies an on/off state of the switching means during a blanking period of the image signals by multiplexing a signal representative of the on/off state with the image signals. It is therefore possible to reduce the number of wires of the cable interconnecting the image pickup means and the processing means.

According to the image input apparatus of the embodiments, the apparatus further includes means for setting a while balance of the image signals to a value shifted for the still image, if the switching means is in an on-state, wherein the second compression means compresses the video signals whose set value is shifted for the still image. Accordingly, it is possible for a user to make a paper sheet of a document, a drawing, or a name card whitish or to make a face color look better, as the user desires it.

According to the image input method of the embodiments wherein an image signal transmitted from image pickup means is compressed by processing means, the image pickup means notifies the processing means of an on/off state of switching means for switching an image pickup between a moving image and a still image, and the processing means selects first compression means suitable for compression of the moving image or second compression means suitable for compression of the still image, in accordance with the notified on/off state. Accordingly, when a still image such as a document, a drawing, and a name card becomes necessary to be transmitted to the partner during video conferencing, the still image can be picked up easily by merely operating upon the switching means provided in the image pickup means, and the second compression means can compress the picked-up still image with high quality.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing system comprising:
   receiving means for receiving signals and user operation instructions transmitted from an image pickup means mounted to an image pickup means housing, and wherein the user operation instructions are sequentially inputted thereto; and
   processing means, mounted to a processing means housing that is different from said image pickup means housing, for processing and compressing the transmitted image signals in accordance with the transmitted user operation instructions, said image pickup means includes switching means for switching an image pickup between a moving image and a still image, and notification means for notifying said processing means of a state of said switching means;
   wherein said processing means includes a first compression means for executing compression for a moving image, a second compression means for executing compression for a still image, and selection means for selecting said first or second compression means in accordance with the notified state of said switching means;
   wherein said processing means includes means for setting a white balance of the image signals to a value shifted for the still image, if said switching means is in an on-state, wherein said second compression means compresses the image signals whose set value is shifted for the still image;
   said notification means notifies a state of said switching means by multiplexing a signal representative of the state with the image signal; and
   the image signals processed by said processing means are displayed on different windows respectively.

2. An image processing system according to claim 1, wherein:
   if said switching means is in a non-operated state, said selection means selects said first compression means; and
   if said switching means is in an operated state, said selection means changes a selection of said first compression means to a selection of said second compression means and resumes a selection of said first compression means after a lapse of a predetermined time.

3. An image processing system according to claim 2, wherein said predetermined time is a time required for said second compression means at least to compress image signals in unit of frame or field.

4. An image processing system according to claim 2, wherein:
   if said switching means continues to be operated, said second compression means continues to compress image signals in unit of frame or field; and
   after the lapse of said predetermined time after said switching means is not operated, an operation by said first compression means resumes.

5. An image processing system according to claim 1, further comprising display means for displaying said compressed image signals, wherein:
   said display means displays image signals compressed by said first and second compression means in different windows; and
   the window displaying the image signals compressed by said second compression means is formed separately for each frame or field.

6. An image input apparatus according to claim 1, wherein said notification means notifies a state of said switching means during a blanking period of the image signals by multiplexing a signal representative of the state with the image signals.

7. An image input method comprising the steps of:
   sequentially inputting user instructions to an image input means using a switching means of said image input means;
   transmitting image data and inputted user instructions from the image input means;
   receiving the transmitted image data and user instructions by processing means mounted to a housing different from the image input means;
   compressing the image data received by said processing means in accordance with the received user instructions, wherein said received user instructions notify said processing means of an on/off state of said switching means for switching the input image between a moving image and a still image;

selecting a first compression means for compression of the moving image or a second compression means for compression of the still image, in accordance with the notified on/off state of the switching means;

setting a white balance of the image signals to a value shifted for the still image, if the switching means is in an on-state, wherein said second compression means compresses the image signals whose set value is shifted for the still image; and displaying images processed by the first and second compression means on different windows respectively.

* * * * *